United States Patent [19]

Kohs

[11] Patent Number: 4,538,271
[45] Date of Patent: Aug. 27, 1985

[54] SINGLE PARITY BIT GENERATION CIRCUIT

[75] Inventor: Dwight W. Kohs, Broomfield, Colo.

[73] Assignee: AT&T Information Systems Inc., Holmdel, N.J.

[21] Appl. No.: 491,279

[22] Filed: May 4, 1983

[51] Int. Cl.³ .............................................. G06F 11/10
[52] U.S. Cl. ...................................................... 371/49
[58] Field of Search ............................ 371/49, 50, 51; 365/200, 201; 364/738

[56] References Cited

U.S. PATENT DOCUMENTS 3,487,363 12/1969 Wall ....................................... 371/49

OTHER PUBLICATIONS

Hill, Introduction to Switching Theory and Logical Design, 2nd ed., 1974, p. 202, 3rd ed., 1981, pp. 241–244.
Mano, Computer Logic Design, 1972, pp. 157–159.
Grimes, IBM Technical Disclosure Bulletin, Two-Dimensional Parity Error Correction Procedure, vol. 25, No. 5, 10/82, pp. 2686–2689.

Primary Examiner—Jerry Smith
Assistant Examiner—Mark Ungerman
Attorney, Agent, or Firm—James M. Graziano

[57] ABSTRACT

The subject parity circuit generates a single parity bit for a prescribed DATA SET. The DATA SET comprises n bytes which are simultaneously transmitted to the parity circuit over n data transmission leads. The n bytes are simultaneously combined bit by bit to determine whether an odd or even number of bits have been received. A cummulative sum is determined, and the single parity bit is generated with the receipt of the last n bits of the DATA SET.

10 Claims, 5 Drawing Figures

SINGLE PARITY BIT GENERATION CIRCUIT

TECHNICAL FIELD

This invention relates to the field of digital error detecting systems and more particularly, to parity circuits for use therein.

BACKGROUND OF THE INVENTION

There are two basic configurations of parity generator circuits known to the art. One configuration is a parallel circuit which receives a byte of data comprising n bits transmitted over n parallel data transmission leads. This parity circuit uses n-1 exclusive OR gates to generate a single parity bit for each byte of received data. (See "Introduction to Switching Theory and Logical Design" 2nd ed. by F. J. Hill and G. R. Peterson, John Wiley & Sons (1974), FIG. 8.31).

The other parity generator configuration is a serial parity circuit. This circuit receives the n bits comprising a byte of data one bit at a time and generates a single parity bit. This serial parity circuit appends the parity bit to the byte of data in an extra bit position located at the end of the byte. This method requires a parity circuit for each data transmission lead. (See "Introduction to Switching Theory and Logical Design" 3rd ed. by F. J. Hill and G. R. Peterson, John Wiley & Sons (1981), pages 241 to 244.)

The problem with these prior art circuits is that they generate a parity bit on a per byte basis. In an application where numerous bytes of data are transmitted during a data transmission, each single byte of data requires a generated parity bit. This method is uneconomical and inefficient in a data-handling system which simultaneously transmits multiple bytes of data.

SUMMARY OF THE INVENTION

This problem is overcome by the subject parity circuit which generates a single parity bit indicative of the parity for a prescribed set of data. The DATA SET comprises multiple bytes of serial data that are simultaneously transmitted over multiple (n) data transmission leads on a one byte per lead basis. The DATA SET has an identifiable starting point corresponding to the 0 bit position and an identifiable ending point corresponding to the last or m bit position of each byte. The n bits in any bit position appear simultaneously on the n data transmission leads.

The n data transmission leads are connected to the subject parity circuit which comprises an input simultaneous bit evaluator, a sequential bit evaluator, and an output simultaneous bit evaluator. The input simultaneous bit evaluator is connected directly to the n data transmission leads. The logic in the input simultaneous bit evaluator combines the bits in each bit position of the received DATA SET and produces a single representative bit for that bit position. Each representative bit denotes whether there is an odd or even number of 1 bits included in the associated bit position. The combination process continues for each bit position in the received DATA SET.

The input simultaneous bit evaluator transmits the representative bits to the sequential bit evaluator which registers the even or odd state of each of the representative bits. When the last (m) representative bit is received by the sequential bit evaluator, the sequential bit evaluator generates a bit indicative of the cumulative number of 1 bits in the first m-1 received bit positions.

The output simultaneous bit evaluator is connected to the sequential bit evaluator and the data transmission leads. The output simultaneous bit evaluator combines the indicative bit with the data bits in the last bit position of the received DATA SET to generate a single parity bit. The single generated parity bit indicates whether the number of 1 bits present in the entire DATA SET is even or odd.

The generation of a single parity bit indicative of the parity of the entire prescribed DATA SET avoids the necessity of generating a parity bit for each byte in the DATA SET. The subject parity circuit generates a single bit for n bytes of data transmission. This provides a more economical and efficient approach to generating parity for a multiple byte simultaneously transmitted DATA SET.

DETAILED DESCRIPTION OF THE DRAWINGS

Figure 1:
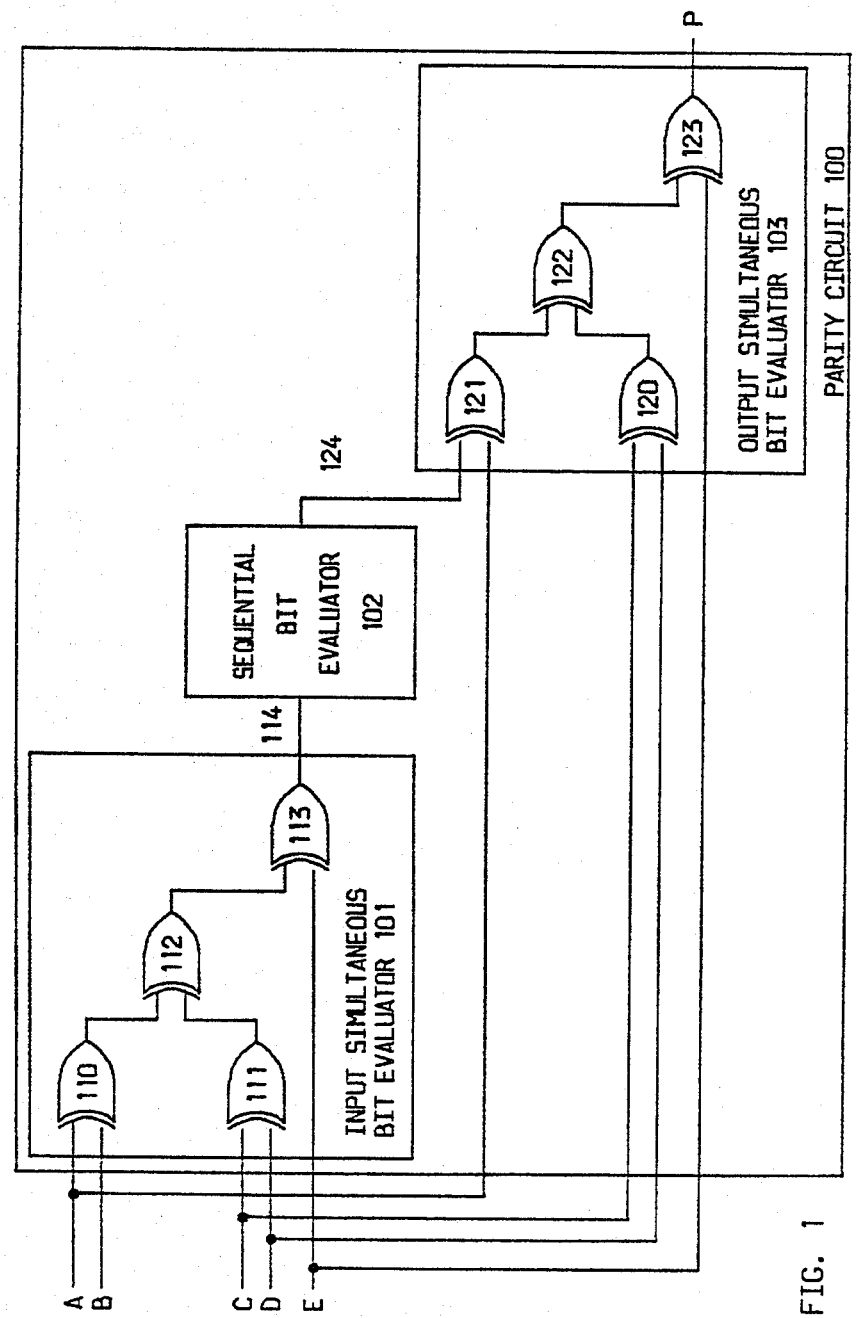
FIG. 1 is a block diagram of the subject parity circuit.

FIG. 1 illustrates parity circuit 100 comprising input simultaneous bit evaluator 101, sequential bit evaluator 102 and output simultaneous bit evaluator 103. Parity circuit 100 receives a prescribed set of serial bytes of data and generates a single parity bit (P) for the entire data set. The serial bytes of data are transmitted simultaneously on a one byte per lead basis over n data transmission leads (A-E). Parity circuit 100 generates odd parity in the preferred embodiment. Therefore, a single 0 bit is output on lead P if the entire DATA SET has odd parity and a single 1 bit is output on lead P if the entire DATA SET has even parity.

FIG. 1 illustrates a five input parity circuit 100 which monitors data transmission leads A through E. The prescribed DATA SET for a five input data transmission comprises five bytes A through E of digital data. Each byte of digital data includes eight serially transmitted data bits. The DATA SET therefore, consists of a 40 bit transmission. The 40 bits are evaluated in a sequential manner according to divisions referred to as increments. An increment includes all the data bits in a corresponding bit position in the five bytes of data. The five data bits which make up each increment are transmitted simultaneously and in synchronization over the five data transmission leads A through E to parity circuit 100.

Data transmission leads A through E connect to the logic in input simultaneous bit evaluator 101 where four exclusive OR gates 110 through 113 combine the data bits in each increment that appear on the five data transmission leads. For each increment, input simultaneous bit evaluator 101 produces a single bit on lead 114 which is representative of either an even or odd number of 1 bits included in an increment. For example, increment 0 of prescribed DATA SET N (FIG. 3) has an arbitrary bit pattern of 1,1,0,0,0. The representative bit produced by input simultaneous bit evaluator 101 for this increment is a 0, which represents that there are an even number of 1 bits in the 0 increment.

The logic in input simultaneous bit evaluator 101 produces a representative bit for each increment in the following manner. Exclusive OR gate 110 combines the data bits received on data transmission leads A and B, and exclusive OR gate 111 combines the data bits received on data transmission leads C and D. Exclusive OR gate 112 combines the signals output by exclusive OR gates 110 and 111. Exclusive OR gate 113 combines the signals output by exclusive OR gate 112 and the data bit received on data transmission lead E resulting in the representative bit which is applied to lead 114.

The representative bit for each increment of data is applied over lead 114 to sequential bit evaluator 102. The logic in sequential bit evaluator 102 is explained in greater detail subsequently. Generally, sequential bit evaluator 102 sequentially monitors all incoming representative bits 0 through 6 for the DATA SET to determine the even or odd state of each representative bit. With the appearance of the next to the last (6th) representative bit, sequential bit evaluator 102 provides an output called the indicative bit which indicates whether an even or odd number of 1 bits have thus far been included in the data transmission. Sequential bit evaluator 102 applies this indicative bit over lead 124 during the occurrence of the last increment to output simultaneous bit evaluator 103.

A single parity bit is generated for the entire DATA SET rather than on a per byte basis. Therefore, one byte is selected to transmit the parity bit for the DATA SET. The parity bit (P) is inserted into the final bit position of this byte, for example the B byte as shown in FIG. 1.

Output simultaneous bit evaluator 103 receives the indicative bit from sequential bit evaluator 102 and the last increment (less the last bit on lead B) from data transmission leads A-E. Output simultaneous bit evaluator 103 comprises four exclusive OR gates 120 through 123. Sequential bit evaluator 102 applies the indicative bit over lead 124 and the last increment bit in byte A appears on data transmission lead A to exclusive OR gate 121. Exclusive OR gate 120 combines the last increment data bits of bytes C and D received on data transmission leads C and D. Exclusive OR gate 122 combines the outputs of exclusive OR gates 120 and 121. Exclusive OR gate 123 combines the output of exclusive OR gate 122 and the last bit of byte E applied over data transmission lead E, and generates a single parity bit (P). Thus, the subject parity circuit 100 serves to evaluate the multiple bytes of serial data comprising a data set, and generates a single parity bit (P) for the entire DATA SET.

The above explanation describes generally how parity circuit 100 simultaneously combines and evaluates the increments of data in a prescribed set that are transmitted over a plurality of data transmission leads. The following description deals specifically with sequential bit evaluator 102 and the logic operations that occur as the representative bits are evaluated to produce the indicative bit which is pivotal in generating the single parity bit (P) for the entire DATA SET.

Sequential Bit Evaluator

Figure 2:
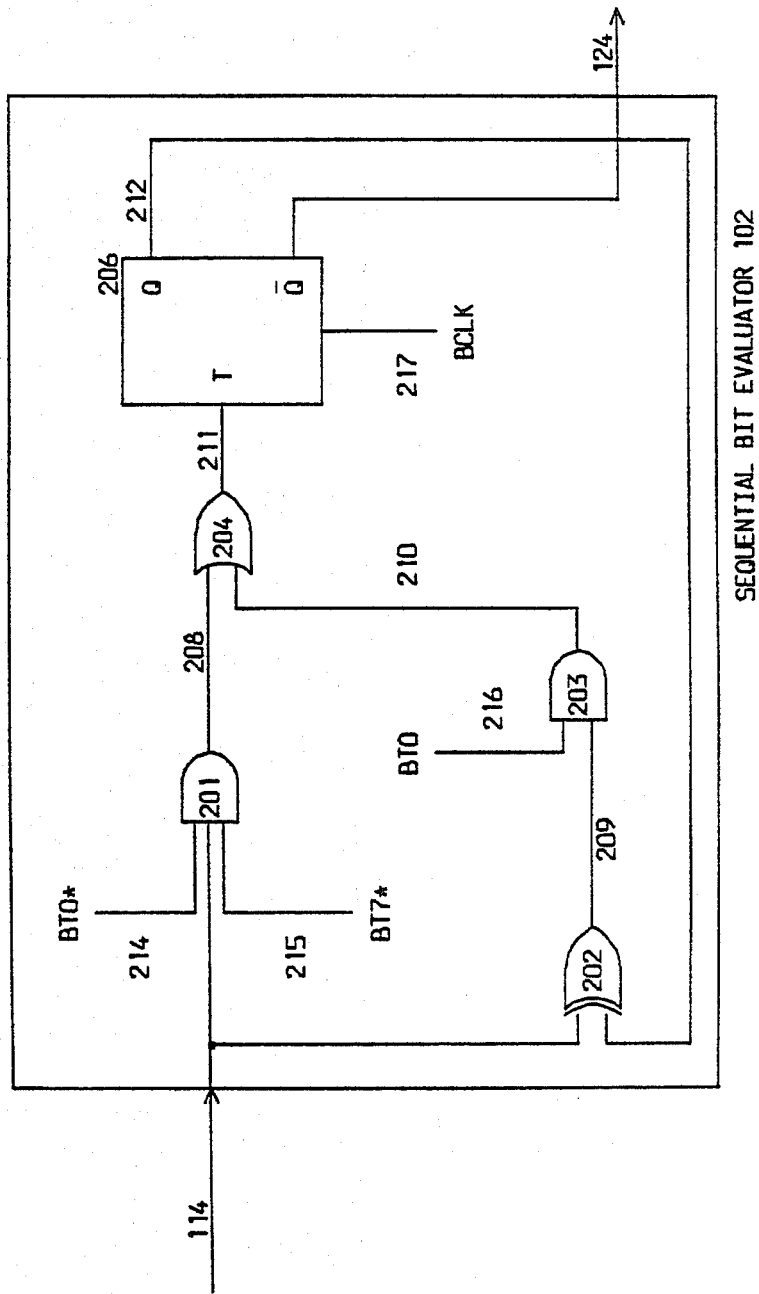
FIG. 2 is a detailed schematic diagram of the sequential bit evaluator.
Figure 3:
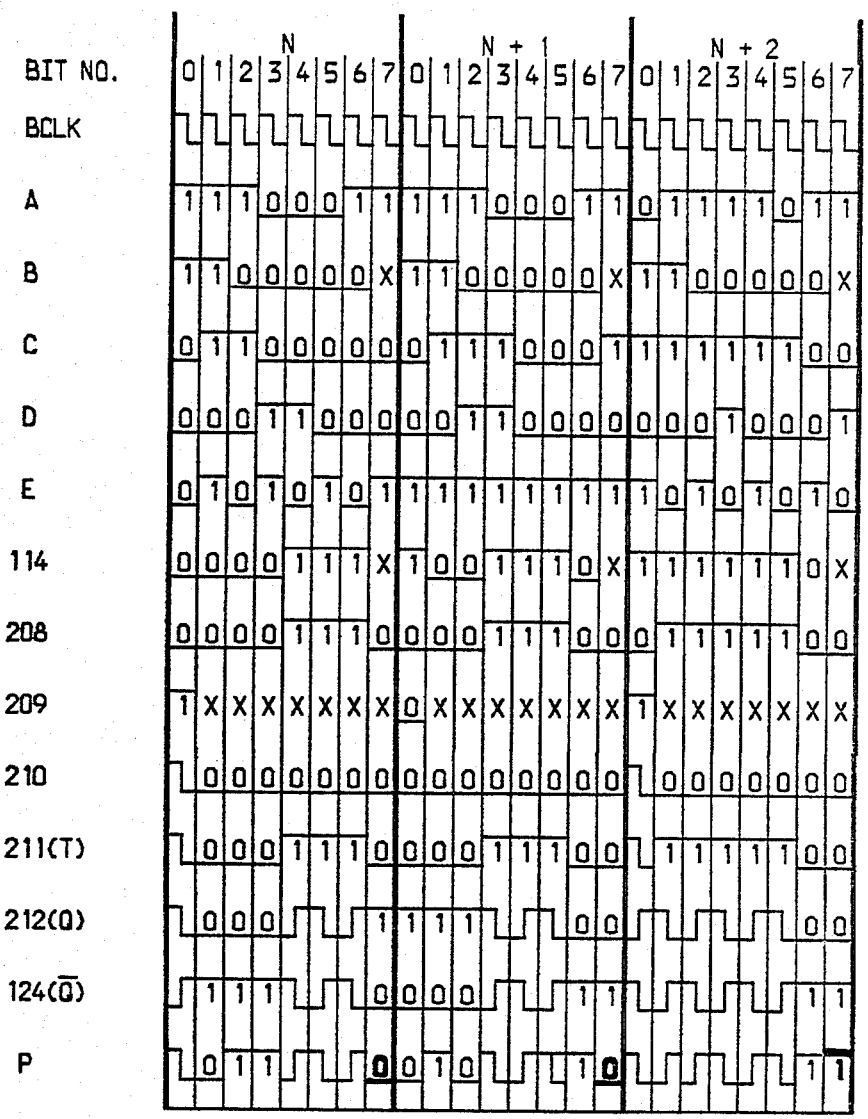
FIG. 3 is a timing diagram of waveforms that occur for a five input data transmission to the sequential bit evaluator.

Given the above set of guidelines, the waveforms illustrated in FIG. 3 are useful in understanding the operation of the parity building block circuit shown in FIGS. 1 and 2. FIG. 3 shows signals that represent the transmission sequence of three DATA SETS. For explanation purposes, DATA SETS N and N+2 will be used. Five bytes of eight bits per byte comprise a DATA SET, and the five bits in each bit position comprise an increment. The bytes are designated A through E and are transmitted to parity circuit 100 on data transmission leads A through E. These transmissions have the indicated arbitrary bit patterns for each byte.

Since the gating of bit combinations through exclusive OR gates is known to the art, it is unnecessary to trace in detail the output logic of the gates in input simultaneous bit evaluator 101 that produces a representative bit for a DATA SET on lead 114.

Initialization

Sequential bit evaluator 102 performs initialization operations at the beginning of each DATA SET with the arrival of the 0 representative bit. Thereafter, all the representative bits which are input over lead 114 to sequential bit evaluator 102 are monitored to determine whether an even or odd number of 1 bits are included in the DATA SET prior to the generation of the last representative bit. Sequential bit evaluator 102 generates a bit indicative of an odd or even number of 1 bits in a DATA SET with the occurrence of the next to the last (6th) increment of a DATA SET.

The 0 Representative Bit—FIG. 2

Assume that there exists a general system clock for the data processing system. The clock serves to synchronize the operations of the data processing circuits. For example, the system clock circuit applies signals on leads BTO, BTO*, BT7* to define the beginning and end of the DATA SET.

Considering representative bit 0, the action of gates (201—204) in sequential bit evaluator 102 alleviates the need to reset flip-flop 206 at the beginning of each new DATA SET. The subject circuit simply establishes the state of flip-flop 206 at representative bit 0 rather than resetting flip-flop 206. The state of flip-flop 206 is set such that the Q output of flip-flop 206 agrees with the even or odd state of the 0 representative bit. During each 0 representative bit, lead BTO* (214) carries a 0 or low and lead BT7* carries a 1 or high. Lead BTO* (214), therefore, serves to inhibit AND gate 201 during the 0 representative bit and a 0 or low is applied to lead 208. Since AND gate 201 is inhibited, the 0 representative bit on lead 114 is combined by exclusive OR gate 202 with the Q output (212) of flip-flop 206. For DATA SET N on FIG. 3, lead 114 carries a 0 or low, and lead 212 carries a 1 or high indicating the toggle flip-flop 206 is providing a 0 parity bit. The inputs to exclusive OR gate 202 are 0 and 1, are exclusive OR gate 202 transmits a 1 or high over lead 209.

The general system clock transmits a signal on lead BTO which signal is the inverse of the signal appearing on lead BTO*. During the 0 representative bit, lead BTO (216) always carries a 1 or high to AND gate 203. In all other instances, representative bits 1 through 7, lead BTO (216) carries a 0 or low to AND gate 203. Thus lead BTO (216) enables AND gate 203 only during representative bit 0. The signal on lead 209 is therefore only significant during representative bit 0. When lead 209 carries a 1 or high, AND gate 203 transmits a 1 or high over lead 210 to OR gate 204. If AND gate 203 applies a 1 or high over lead 210 during the 0 representative bit while lead 208 carries a 0 or low, OR gate 204 transmits a 1 or high over lead 211 to the toggle input terminal of flip-flop 206. Flip-flop 206 now toggles at the negative edge of the clock pulse applied to lead BCLK by system clock during this 0 representative bit. Flip-flop 206 output Q is now a 0 or low and the state of flip-flop 206 now matches the 0 representative bit.

Representative Bits 1 Through 6

During representative bits 1 through 6 the signal on lead 211 causes flip-flop 206 to change state as follows. The system clock enables gate 201 via clock leads BT0* and BT7* during representative bits 1-7. Gate 201 therefore passes the received representative bit from lead 114 to lead 208. Lead 210 always applies a 0 or low to gate 204 during representative bits 1 through 6. The signal on lead 208 (the representative bit), determines the output of OR gate 204 as applied to lead 211. Flip-flop 206 toggles only when OR gate 204 applies a 1 or high to lead 211. Flip-flop 206 toggles during a negative edge triggered clock (BCLK) pulse (217) which causes the transition to be centered in a bit period. In summary, flip-flop 206 monitors representative bits 1 through 6 as they pass through gates 201 and 204 and registers every instance when lead 211 inputs a 1 or high as is the case during representative bits 0, 4, 5 and 6 in DATA SET N. At representative bit 7, flip-flop 206 indicates that an odd number of 1 bits or highs (in this case, 13) have been received by input simultaneous bit evaluator 101. Therefore, flip-flop 206 transmits a low or 0 indicative bit over lead 124 ($\overline{Q}$) during the last or 7th increment.

The 7th Representative Bit

Consider representative bit 7 for DATA SET N as applied to sequential bit evaluator 102 over lead 114. As has previously been stated, three-input AND gate 201 inhibits the effect of the 0 bit representative. Gate 201 also inhibits the effect of representative bit 7. Gate 201 transmits a 0 or a low over lead 208 during representative bit 7 because lead BT0* (214) applies a 1 or high and lead BT7* (215) applies a 0 or low. Representative bit 7, therefore, is not evaluated by the sequential bit evaluator 102.

Indicative Bit

The indicative bit output by flip-flop 206 over lead 124 is an indication of the odd or even number of 1 bits that have been received by input simultaneous bit evaluator 101 in increments 0 through 6. A 0 or low indicative bit is applied to lead 124 if the count is even and a 1 or high indicative bit is applied if the count is odd. Output simultaneous bit evaluator 103 then simultaneously combines the indicative bit with the 7th increment bits from bytes A, C, D and E received on data transmission leads A, C, D and E. At this point in time, sequential bit evaluator 102 has evaluated the first 35 data bits, increments 0 through 6 in the DATA SET. All bits 7 except for the B byte bit 7 (which is reserved for a parity bit) are now evaluated in combination with the indicative bit to determine the parity of the DATA SET. If the sum of the 39 data bits evaluated is even, the parity bit (P) will be a 1 or odd. If the sum is odd, the parity bit (P) will be 0. The resulting parity bit is output over lead P. In the present case, output simultaneous bit evaluator 103 applies a 0 or low to lead P (FIG. 1) indicating that the received DATA SET contains an odd number of 1 bits or highs (15) and is maintaining an odd parity.

Consider now the arbitrary bit pattern of example DATA SET N+2. Again, depending on the bits applied through the various logic functions in parity circuit 100, the logic in parity circuit 100 performs as already described beginning with initialization during the 0 representative bit and completing operations with representative bit 7. The significant factor in this example is that the bits in increments 0 through 6 total an even number of 1 bits or highs for the DATA SET. Therefore, sequential bit evaluator 102 transmits a 1 or high over lead 124 ($\overline{Q}$) (the indicative bit) to output simultaneous bit evaluator 103. Given that there are an even number, 20, of 1 bits or highs included in the DATA SET parity circuit 100 (FIG. 1) generates a 1 or high as an output over lead P with the appearance of the last increment of the DATA SET.

The significant consideration in the above examples is that the subject parity circuit generates a single parity bit (P) for a DATA SET that is separated into equal portions and synchronously input to the parity circuit over a plurality of data transmission leads. This single parity bit (P) identifies the parity of the entire DATA SET which precludes the need for generating a parity bit (P) for each byte of serial data applied over a data transmission lead. The generation of a single parity bit (P) serves to efficiently and economically evaluate DATA SETS that are, for example, transmitted through a data-handling system.

Figure 4:
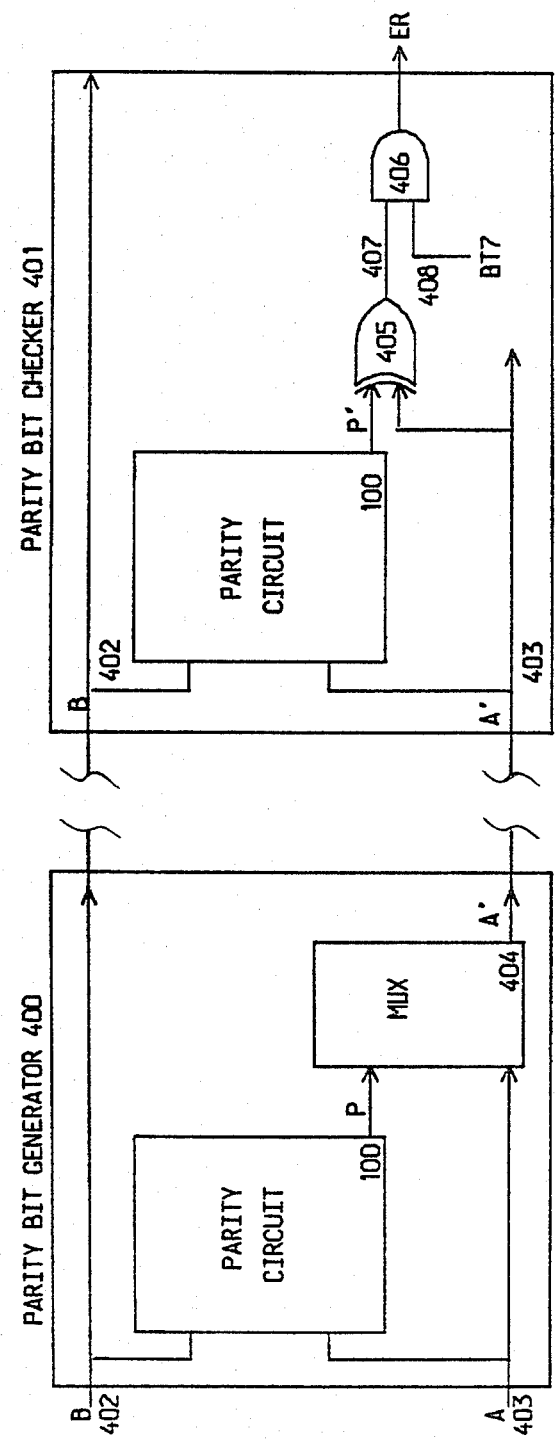
FIG. 4 illustrates an application of the subject parity circuit for use in a data transmission system as both a parity bit generator and a parity bit checker.

Parity Circuit Applications—FIG. 4

The subject parity circuit has a wide variety of applications that is primarily used to detect errors in data transmissions. Errors are detected when a parity bit generated at the originating end of the data transmission is transmitted to the destination where it is compared with a parity bit generated at the receiving end of data transmission. (See "Computer Logic Design" by M. M. Mano, Prentice-Hall, Inc. (1972), pp. 157-159.)

Figure 5:
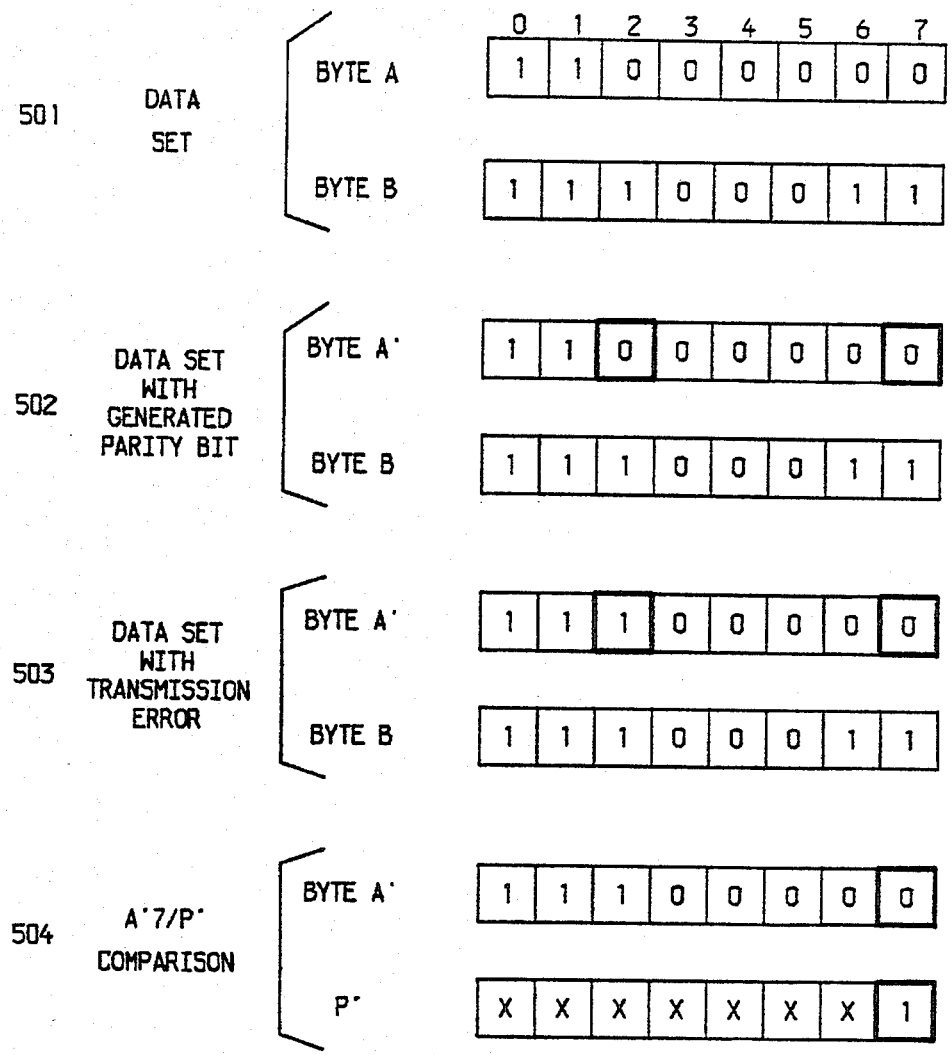
FIG. 5 illustrates a sample DATA SET as it appears to the parity bit generator and parity bit checker shown in FIG. 4.

FIG. 4 illustrates an application of the subject parity circuit 100 as it may be used in a data-handling system. For explanation purposes, only a two-input system will be discussed although it is to be understood that n data transmission leads may be evaluated by the subject parity circuit. FIG. 5 illustrates an arbitrary bit pattern of two bytes, A and B. These bytes comprise a 16 bit DATA SET.

Parity Bit Generator

Parity bit generator 400 comprises parity circuit 100 and multiplexor (MUX) 404. Data transmission leads A and B input to parity bit generator 400. Parity circuit 100 simultaneously and sequentially evaluates the data bits in bytes A and B based on the logic previously described. Thereafter, parity circuit 100 generates a single parity bit (P) during the 7th bit position for the 16 bit DATA SET. In this example, the A byte is designated for parity bit (P) insertion. Therefore, only the A byte inputs to MUX 404.

The indicative bit on lead P and the 7th bit on lead A are input to MUX 404 simultaneously. The parity bit P is then switched by MUX 404 to replace data bit 7 on the A byte. The darkened square A7 in example 2 of FIG. 5 indicates the parity of the DATA SET. There are an odd number (7) of 1 bits or highs in the DATA SET therefore, to maintain the odd parity for the preferred embodiment, a 0 or low parity bit is generated.

Parity Bit Checker

The bytes are transmitted over data transmission leads A' and B to the destination which includes parity bit checker 401. Parity bit checker 401 comprises parity circuit 100, exclusive OR gate 405 and AND gate 406. Again, parity circuit 100 evaluates the data bits applied over data transmission leads A' and B, and generates a parity bit (P') for the received DATA SET. Only the generated parity bit (P') and the transmitted parity bit (P) are significant to the parity bit checker circuit and therefore, further discussion deals only with these bits. In the case of parity bit checker 401, the generated parity bit (P') inputs directly to exclusive OR gate 405. Transmitted parity bit (P) and generated parity bit (P'), both of which correspond to the 7th bit position are simultaneously input to exclusive OR gate 405. Exclusive OR gate 405 then compares the generated parity bit (P') on lead P with received parity bit (P) on data transmission lead A'. The output of exclusive OR gate 405 is carried by lead 407 to AND gate 406. AND gate 406 is enabled by lead BT7 (408) which receives a signal from the system clock and is the inverse of the signal on lead BT7* upon the arrival of increment 7. With the occurrence of increment 7, the output of AND gate 406 over path ER indicates whether an erroneous transmission occurred. Error in transmission is indicated if AND gate 406 outputs a 1 or a high which results from nonmatching parity bits, P and P'. Conversely, if AND gate 406 outputs a 0 or a low, there is no transmission error. The single output from parity bit checker 401 indicates the status, erroneous or not, of the transmission of the entire DATA SET. This method precludes error detection for each individual byte of data. Evaluating an entire set of data is quickly and efficiently accomplished.

Transmission Error—FIG. 5

FIG. 5 further illustrates an example of an error in the DATA SET and the effect of the above-described application of parity circuit 100 as shown in FIG. 4. As previously mentioned, the bytes A and B have been assigned arbitrary bit patterns and byte A has been designated as the byte that will carry the parity bit in the last position, bit 7. Bytes A and B are input to parity bit generator 400 where parity circuit 100, based on the logic located within, evaluates the bits and generates a parity bit (P) for the DATA SET (see examples 501 and 502 on FIG. 5). MUX 404 isolates and replaces the 7th bit on the A byte with a 0 or low parity bit indicating that an odd number of data bits are present in the transmission.

Assume for explanation purposes that in byte A', as indicated in example 503 on FIG. 5, a transmission error occurs (due, for example, to a burst of noise) and that the 0 bit position A2 has been replaced with a 1 or high at some point in the transmission. Bytes A' and B as altered by noise are input to parity bit checker 401 where parity circuit 100 evaluates the DATA SET and outputs generated parity bit (P') to exclusive OR gate 405. As example 504 of FIG. 5 shows, generated parity bit P' is a 1 or high which indicates there is an even number (8) of 1 bits or highs in the DATA SET (bytes A' and B). At this point, the logic of exclusive OR gate 405 and AND gate 406 compares received parity bit (bit 7 on byte A') with generated parity bit (P') to determine if an erroneous transmission has occurred. Note, that A' 7 is a 0 and P' is a 1 and, as a result, AND gate 406 outputs over lead ER a 1 or high. Therefore, an error is indicated in the data transmission.

The above explanation illustrates an application of the subject invention as applied to a data handling system where there are n data transmission leads. The subject parity circuit allows for the generation of a single parity bit indicative of the parity of an entire data set. The generation of a single parity bit at the transmitting and receiving end of a data transmission system allows the transmissions occurring in defined data sets to be monitored for any erros. The design of the subject parity circuit eliminates the need to generate a parity bit for each byte of data appearing on every lead, thus providing a more economical and efficient evaluation of incoming serial data.

It is to be understood, therefore, that while the present invention has been described by reference to a particular embodiment thereof, numerous modifications and alterations may be made by those skilled in the art without departing from the spirit and scope of the invention.

What is claimed is:

1. A method for generating a single parity bit for a prescribed set of data where each set comprises n serially transmitted increments of data with each of said increments containing a plurality of bits, which bits are simultaneously input to a parity circuit over a like plurality of data transmission leads in synchronization with control signals which delimit the beginning and the end of said prescribed set wherein said method includes the steps of:

combining simultaneously in response to a first control signal that delimits the beginning of said prescribed set all of said bits in each one of said increments as received to produce an associated representative bit for each of the first received n−1 increments of said n increments indicating whether an odd or even number of 1 bits are included in each of said n−1 increments;

registering sequentially the odd or even state of each of said produced represented bits for each of said received n−1 increments;

producing from said registered representative bits an indicative bit indicating a cumulative odd or even state of all received n−1 increments in response to a second control signal that delimits the end of said prescribed set corresponding to a receipt of a last increment, "n"; and generating in response to the receipt of said "n" increment and said indicative bit a single parity bit indicative of the parity for said prescribed set of data.

2. The method of claim 1 wherein the step of registering sequentially includes:

initializing said parity circuit to indicate a receipt of a first increment of said prescribed set of data in response to a first prepared representative bit.

3. The method of claim 1 wherein the step of producing includes:

storing a cumulative indication of an odd or even number of 1 representative bits produced in response to each of said received n−1 increments.

4. The method of claim 1 wherein the step of producing further includes:

inserting said indicative bit into a predetermined last bit position of said received "n" increment of said prescribed set of data.

5. The method of claim 1 wherein the step of generating includes:
combining said "n" increment and said indicative bit to produce a single parity bit for said prescribed set of data.

6. In a data handling system, a parity circuit connected to a plurality of data transmission leads over which is transmitted a prescribed data set having n increments of data where each of said increments contains a like plurality of bits and where each of said increments included in said data set is serially transmitted to said parity circuit in synchronization with control signals that delimit the first and last increment of said prescribed data set, comprising:
means connected to said data transmission leads for simultaneously combining in response to a first control signal that delimits the first increment of said prescribed data set all of said bits in each one of said increments as received to produce an associated representative bit for each of the first received n−1 increments indicative of the odd or even number of 1 bits included in each received n−1 increment;
sequential bit evaluator means connected to said simultaneously combining means and responsive to said produced representative bits associated with said n−1 increments and further responsive to a second control signal that delimits the end of said prescribed data set as generated with a receipt of a last increment n for generating an indicative bit representing the odd or even cumulative number of 1 bits included in all received n−1 increments; and
means connected to said sequential bit evaluator means and responsive to said indicative bit and the receipt of said n increment for generating a single parity bit indicative of the parity for said prescribed data set.

7. The circuit of claim 6 wherein said sequential bit evaluator means comprises:
means for initializing said parity circuit to indicate a receipt of a first associated representative bit of a first increment of said prescribed data set.

8. The circuit of claim 7 wherein said sequential bit evaluator means further comprises:
means for registering sequentially an indication of the even or odd state of each of said produced representative bits for each of said received n−1 increments; and
means responsive to said registering means for providing a bit indicative of the odd or even number of 1 bits included in each received n−1 increment of said prescribed data set.

9. The circuit of claim 8 wherein said sequential bit evaluator means further comprises:
means for inserting said indicative bit into a preselected bit position of said received n increment of data in said prescribed data set.

10. The circuit of claim 6 wherein said generating means comprises:
means for combining in response to a receipt of said n increment over said data transmission leads and said indicative bit into said single parity bit for said prescribed data set.

* * * * *